UNITED STATES PATENT OFFICE.

WILLIAM K. LEONARD, OF PIQUA, OHIO.

PROCESS OF PRODUCING RUBBER SUBSTITUTES AND COMPOSITIONS OF MATTER THEREFOR.

SPECIFICATION forming part of Letters Patent No. 615,864, dated December 13, 1898.

Application filed May 16, 1898. Serial No. 680,857. (No specimens.)

*To all whom it may concern:*

Be it known that I, WILLIAM K. LEONARD, a citizen of the United States, residing at Piqua, in the county of Miami and State of Ohio, have invented a certain new and useful Improvement in Processes of Producing Rubber Substitutes and in Compositions of Matter Therefor, of which the following is a full, clear, and exact description.

My invention relates to what are known in the market as "rubber substitutes;" and it consists, first, in the discovery that corn-oil, an article produced from Indian corn, may be vulcanized by mixing it with sulfur or certain compounds of sulfur and that this vulcanization may be produced without the application of artificial heat. When pure sulfur—as, for instance, the flowers of sulfur—is used, heat is necessary to bring about the chemical reaction which results in the vulcanization of the oil and which produces a product more fully described in my application filed of even date with this.

Where I wish to produce the vulcanization of the corn-oil without the application of artificial heat, I find it desirable, if not necessary, to use some of the compounds of sulfur—as, for instance, chlorid of sulfur.

My invention also consists in the process hereinafter described of producing a rubber substitute by the vulcanization of the corn-oil and the introduction of other ingredients to give the product certain desired qualities; and my invention also consists in the new composition of matter for such rubber substitute.

In practice I place in a vessel, preferably a wooden tub, corn-oil and castor-oil in the approximate proportions of sixty-four per cent. of corn-oil and thirteen per cent. of castor-oil. These two oils are thoroughly mixed and their relative proportions may be slightly varied; but I find the proportions above given the most satisfactory and give the best results. In a separate vessel I mix chlorid of sulfur, naphtha, and oxid of magnesia. The proportions I have found to produce the best result are in relation to the entire mass twenty-one per cent. of chlo..d of sulfur, one-half of one per cent. of naphtha, and one and one-half per cent. of oxid of magnesia. These percentages are based upon weight and not bulk and may be slightly, though not materially, varied. When the contents of both these vessels have been thoroughly mixed, one is poured into the other and thoroughly mixed, so as to evenly distribute or make the entire mass thoroughly homogeneous. The chemical reaction resulting from this combination at once develops heat and an effervescent state, resulting in the enlargement of the bulk of the mass to a very considerable extent. The heat reaches a very considerable degree, possibly one hundred and fifty or more. The mass is then allowed to cool, and the resulting product is a white spongy substance ready for the market ground into a powder to be mixed with crude rubber and then manufactured into the rubber goods of commerce.

It must be understood that the essentials of the process are the corn-oil and the sulfur or a compound of sulfur. I have mentioned the chlorid of sulfur as the sulfur compound I prefer, but do not limit myself to the chlorid of sulfur, as there may be other compounds of sulfur that may answer the same purpose. The naphtha and oxid of magnesia are not essentials, though they improve in many respects the product. A substitute may be used for the castor-oil possessing and producing similar qualities.

I am aware that rubber substitutes of various kinds and qualities have heretofore been manufactured, and I do not broadly claim the production of a rubber substitute. My product, however, is superior in many qualities to any of the rubber substitutes heretofore produced and is very much more economical and, so far as I am aware, is entirely new.

Having thus described my invention, what I claim, and desire to secure by Letters Patent, is—

1. The above-described process of producing a rubber substitute by the mixture of corn-oil and castor-oil in substantially the proportions named, with the mixture of chlorid of sulfur, naphtha, and oxid of magnesia in substantially the proportions named, as and for the purpose described.

2. A composition of matter for a rubber substitute consisting of corn-oil, castor-oil, chlorid of sulfur, naphtha, and oxid of magnesia substantially in the proportions and for the purpose described.

WILLIAM K. LEONARD.

Witnesses:
ARTHUR STEM,
GEORGE HEIDMAN.